United States Patent
Hu et al.

(12) 
(10) Patent No.: US 6,476,967 B2
(45) Date of Patent: Nov. 5, 2002

(54) COMPACT OPTICAL CIRCULATOR WITH THREE PORTS

(75) Inventors: Chieh Hu, Taichung (TW); Chen-Bin Huang, Hsinchu (TW); Chin-Lan Liao, Yanlin (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/985,139

(22) Filed: Nov. 1, 2001

(65) Prior Publication Data

US 2002/0141034 A1 Oct. 3, 2002

(30) Foreign Application Priority Data

Mar. 27, 2001 (TW) ........................................ 90107142 A

(51) Int. Cl.[7] ........................... G02B 27/28; G02B 6/26; G02F 1/09
(52) U.S. Cl. ..................... 359/484; 359/256; 359/281; 359/301; 385/16; 385/17
(58) Field of Search ................................ 359/249–252, 359/255, 256, 279, 280–283, 301, 303, 320, 483, 484, 117, 127, 128; 385/16, 17

(56) References Cited

U.S. PATENT DOCUMENTS

| | | | | |
|---|---|---|---|---|
| 4,461,543 A | * | 7/1984 | McMahon | 385/17 |
| 5,204,771 A | | 4/1993 | Koga | 359/281 |
| 5,414,541 A | * | 5/1995 | Patel et al. | 359/256 |
| 5,694,233 A | * | 12/1997 | Wu et al. | 359/117 |
| 5,912,748 A | * | 6/1999 | Wu et al. | 359/117 |
| 5,933,269 A | * | 8/1999 | Robinson | 359/280 |
| 6,005,697 A | * | 12/1999 | Wu et al. | 359/117 |
| 6,014,244 A | * | 1/2000 | Chang | 359/281 |
| 6,173,092 B1 | * | 1/2001 | Bergmann | 359/117 |
| 6,175,432 B1 | * | 1/2001 | Wu et al. | 359/122 |
| 6,236,506 B1 | * | 5/2001 | Cao | 359/484 |
| 2001/0053022 A1 | * | 12/2001 | Tai et al. | 359/484 |
| 2002/0003651 A1 | * | 1/2002 | Sui | 359/280 |
| 2002/0009254 A1 | * | 1/2002 | Sui | 385/16 |

* cited by examiner

*Primary Examiner*—Evelyn A Lester
(74) *Attorney, Agent, or Firm*—Birch, Stewart, Kolasch & Birch, LLP

(57) ABSTRACT

The invention provides a compact optical circulator with three ports positioning between a dual-core collimator and a single-core collimator. The inventive circulator has a propagation director to couple a light from the dual-core collimator to one port of the circulator and another light form the other port of the circulator to the dual-core collimator. The invention further provides a compact optical circulator with three ports having a reflective compensator. The reflective compensator compensates the optical path length of two polarized beams. Furthermore, the invention eliminates the polarization mode dispersion by utilizing a reflective compensator. As well, the inventive circulator forgoes use of the reciprocal polarizing-rotating unit, thus reducing production costs.

18 Claims, 14 Drawing Sheets

COMPACT OPTICAL CIRCULATOR WITH THREE PORTS

BACKGROUND OF THE INVENTION

1. Field of the Invention

The invention relates to an optical circulator, and more particularly to an optical circulator with three ports for use in optical communication.

2. Description of the Related Art

In a three port optical circulator, an optical signal input at the first port will be transmitted to the second port. An optical signal input at the second port will be transmitted to the third port.

With reference to FIG. 1, a compact circulator is disclosed in U.S. Pat. No. 5,204,771 by Koga. This circulator shows an improvement over the previous one since the two optical paths can be in close proximity, and the first and third ports 27, 28 are parallel.

Unfortunately, this device still suffers from a disadvantage. If the first and third ports 27, 28 are very close together, the first and third fibers will have to share a common lens for collimating and focusing. It is impossible for a single lens to perform adequately for both fibers. The difficulty can be traced to the fact that the light beams coupled to the first and third ports are parallel, and a single lens cannot focus two parallel beams to two different points. Therefore, the circulator has a problem of coupling angle.

SUMMARY OF THE INVENTION

The invention provides a compact optical circulator with three ports, wherein a propagation director is provided to solve the problem of coupling angle. The propagation director can focus two parallel beams appearing on the same side of the compact optical circulator to two different points (i.e. to two different fibers).

It is an object of the present invention to provide a compact optical circulator, including a dual-core collimator, a propagation director, a first birefringent device, a first polarization rotator, a second birefringent device, a second polarization rotator, a third birefringent device and a single-core collimator.

The invention further provides a compact optical circulator with three ports, wherein a reflective compensator is provided to eliminate the polarization mode dispersion ("PMD").

It is another object of the present invention to provide a compact optical circulator, including a dual-core collimator, a propagation director, a first birefringent device, a first polarization rotator, a second birefringent device, a second polarization rotator, a compensator, a third birefringent device and a single-core collimator.

A feature of the invention is that one beam from the first port to the second port is normally incident on the first birefringent by passing through the propagation director. Thus, the compact optical circulator of the invention has an advantage of reduction of polarization dependent loss.

Another feature of the invention is that the first and second polarization rotators are the non-reciprocal rotators respectively.

The compact optical circulator of the invention has another advantage of reduction of production cost. A non-reciprocal rotator aligning with the optical axis of the birefringent device replaces the use of a reciprocal rotator and a non-reciprocal rotator, and thus the invention reduces production costs.

The compact optical circulator of the invention has another advantage of elimination of the polarization mode dispersion utilizing a reflective compensator.

BRIEF DESCRIPTION OF THE DRAWINGS

This and other objections and features of the invention will become clear from the following description, taken in conjunction with the preferred embodiments with reference to the drawings, in which.

DETAILED DESCRIPTION OF THE PREFERRED EMBODIMENTS

First Embodiment

Figure 1:
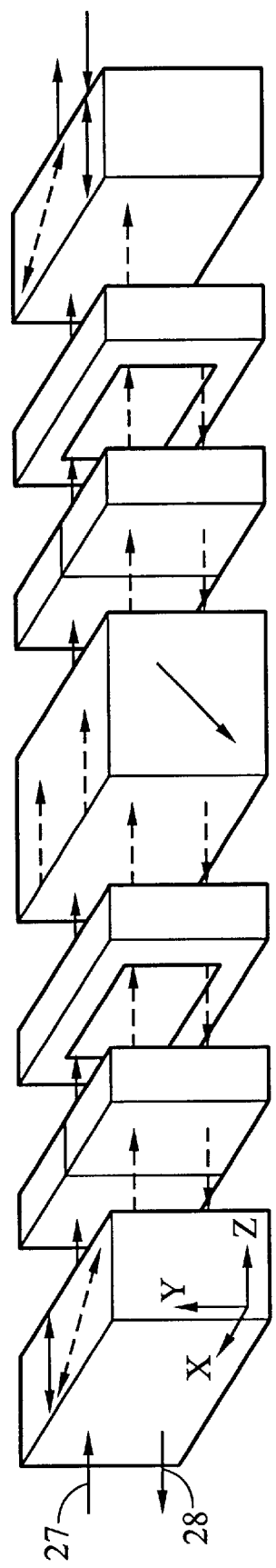
FIG. 1 schematically shows a conventional optical circulator.
Figure 2A:
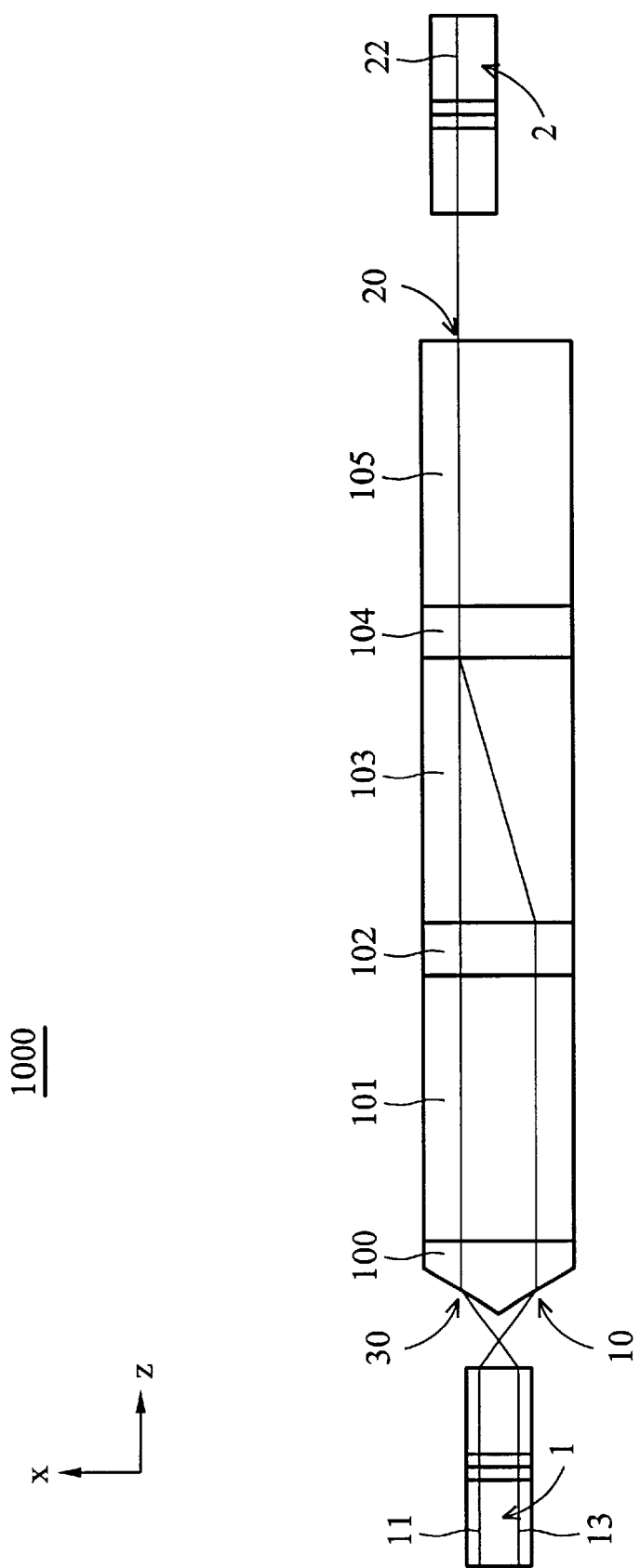
FIG. 2A is a top plane view showing a compact optical circulator of the first embodiment of the invention.
Figure 2B:
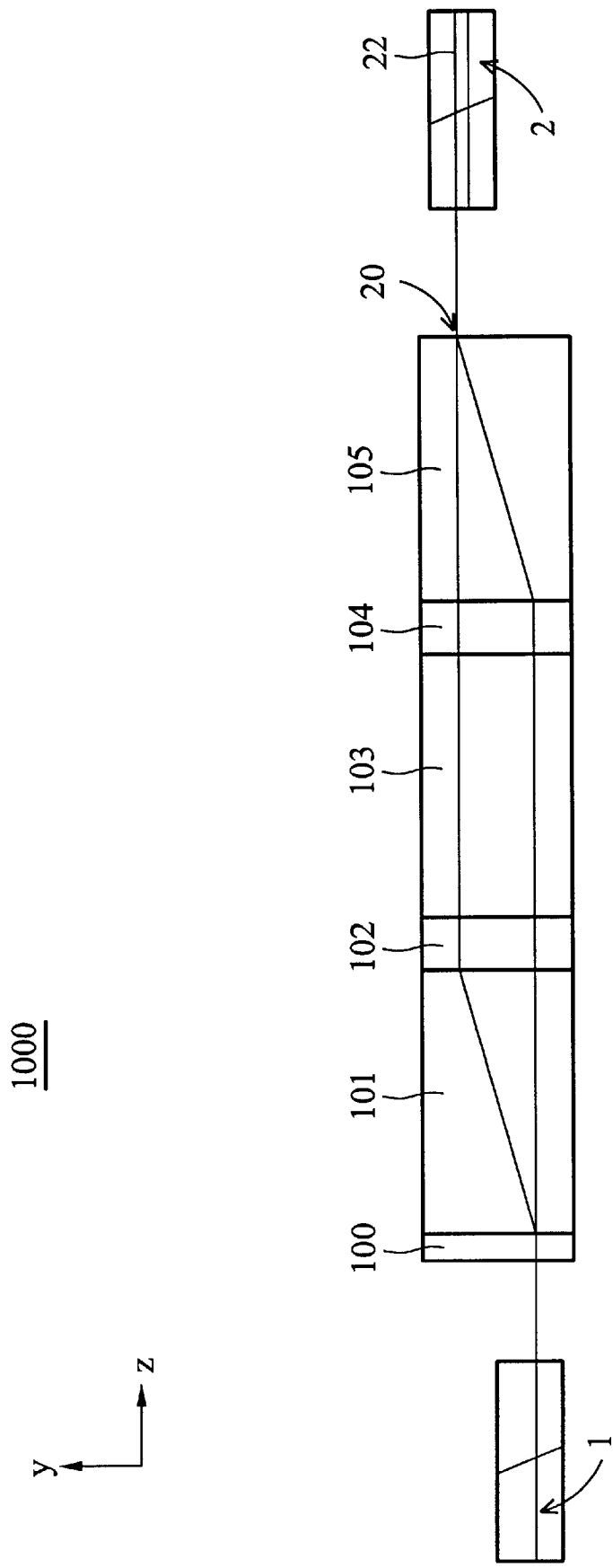
FIG. 2B is a side view showing a compact optical circulator of the first embodiment of the invention.

FIG. 2A is a top plane view showing a compact optical circulator of the first embodiment of the invention, and FIG. 2B is a side view showing a compact optical circulator of the first embodiment of the invention. In the first embodiment of the invention, the compact optical circulator 1000 includes a dual-core collimator 1, a propagation director 100, a first birefringent device 101, a first polarization rotator 102, a second birefringent device 103, a second polarization rotator 104, a third birefringent device 105 and a single-core collimator 2.

The dual-core collimator 1 generally has a first fiber 11, a third fiber 13 and a GRIN lens (not shown), wherein the first and third fibers 11, 13 are parallel. The compact optical circulator 1000 has three ports; wherein the first and third ports 10, 30 are located at the same side of the circulator 1000, and the second port 20 is located at the other side of the circulator 1000. The dual-core collimator 1 emits a light beam to the first port 10 of the circulator 1000, and receives another light beam from the third port 30 of the circulator 1000. In general, the light beam emitted from the first fiber 11 of the dual-core collimator 1 is refracted by travelling through the GRIN lens, and then must be coupled to the first port 10 of the circulator 1000. Then, a propagation director 100 with a refracting plane is formed to direct the light beam from first fiber 11 to first port 10 by Snell's law. Another light beam emitted from the third port 30 of the circulator 1000 must be coupled to the third fiber 13 of the dual-core collimator 1. Then, the propagation director 100 with another refracting plane is formed to direct the light beam from third port 30 to third fiber 13 by Snell's law. Therefore, the propagation director 100 can direct one light beam from first fiber 11 to first port 10 and another light beam from third port 30 to third fiber 13 at the same time.

The first birefringent device 101 is a birefringent crystal, such as $LiNbO_3$, $YVO_4$ etc, and has walk-off characteristics. While the first port 10 receives a light beam, the light beam is divided into an e-ray and o-ray by the first birefringent device 101, wherein both the e-ray and o-ray have orthogonal polarizations. While a light beam is received from the second port 20 and divided into two polarized beams in the circulator 1000, the two polarized beams are combined together by the first birefringent device 101.

The first and second polarization rotators 102, 104 respectively have a non-reciprocal polarizing-rotating crystal, such as Faraday rotator, and a reciprocal polarizing-rotating unit, such as a half-wave plate. As well, the first and second polarization rotators 102, 104 can further forgo the use of the reciprocal polarizing-rotating unit, and only include the non-reciprocal polarizing-rotating crystal.

The second birefringent device 103 is also a birefringent crystal and has an optical axis. While a light beam is received from the first port 10 or second port 20 and divided into two polarized beams, the two polarized beams are shifted or not according to the optical axis.

The third birefringent device 105 is also a birefringent crystal. While the second port 20 receives a light beam, the light beam is divided into an e-ray and o-ray by the third birefringent device 105, wherein both the e-ray and o-ray have orthogonal polarizations. While a light beam is received from the first port 10 and divided into two polarized beams in the circulator 1000, the two polarized beams are combined together by the third birefringent device 105.

FIRST EXAMPLE

In the first example, the compact optical circulator with three ports includes: a dual-core collimator, a propagation director, a first birefringent crystal, a first polarization rotator, a second birefringent crystal, a second polarization rotator, a third birefringent crystal, and a single-core collimator. The first and second polarization rotators respectively have a Faraday rotator and a half-wave plate.

Figure 3A:
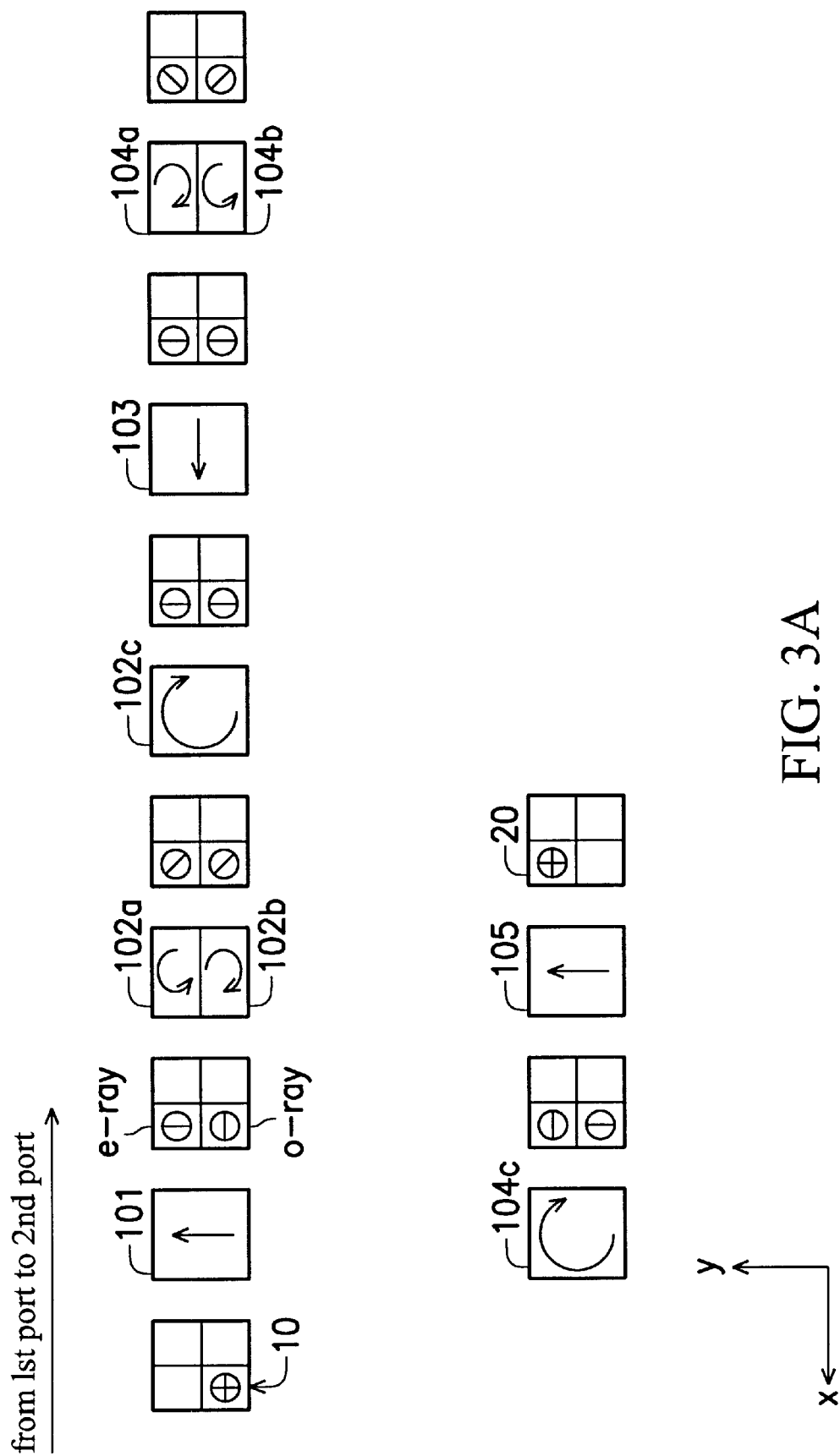
FIG. 3A schematically shows the spatial location and the polarizations of the light beam traveling from the first port to the second port in the compact optical circulator of the first example.

FIG. 3A schematically shows the spatial location and the polarizations of the light beam traveling from the first port to the second port in the compact optical circulator of the first example. Each arrow respectively shows the projecting component of the optical axis of each birefringent crystal in the x-y plane. While a light beam emitted from the first fiber 11 of the dual-core collimator 1 is received by the first port 10 of the circulator 1000, the polarization of the light beam is random. When the light beam travels through the first birefringent crystal 101, the light beam is split into two polarized beams according to the arrow representing the walk-off characteristic of the first birefringent crystal 101. One is an e-ray polarized along the y-axis and the other is an o-ray polarized along the x-axis. Next, the e-ray and o-ray respectively travel through the Faraday rotators 102a, 102b, the polarization of the e-ray rotates counterclockwise 45 degrees and the polarization of the o-ray rotates clockwise 45 degrees. Next, the two polarized beams travel through the half-wave plate 102c, the two beams rotate clockwise 45 degrees. After the e-ray and o-ray travel through the first polarization rotator, the o-ray is changed into another e-ray and the two polarized beams pass the second birefringent crystal 103. Next, the two polarized beams travel through the Faraday rotator 104a, 104b of the second polarization rotator 104, one rotates clockwise 45 degrees and the other rotates counterclockwise 45 degrees. Next, the two polarized beams travel through the half-wave plate 104c, and the two polarized beams rotate clockwise 45 degrees. When the e-ray travels through the first polarization rotator 102, the second birefringent crystal 103 and the second polarization rotator 104, the e-ray is changed into o-ray. When the o-ray travels through the first polarization rotator 102, the second birefringent crystal 103 and the second polarization rotator 104, the o-ray is changed into e-ray. When the e-ray and o-ray travel through the third birefringent crystal 105, the two polarized beams (e-ray and o-ray) are combined together; wherein the e-ray is shifted toward the o-ray according to the arrow representing the walk-off characteristic of the third birefringent crystal 105. Finally, the second port 20 of the circulator 1000 outputs the light beam into the single-core collimator 2.

Figure 3B:
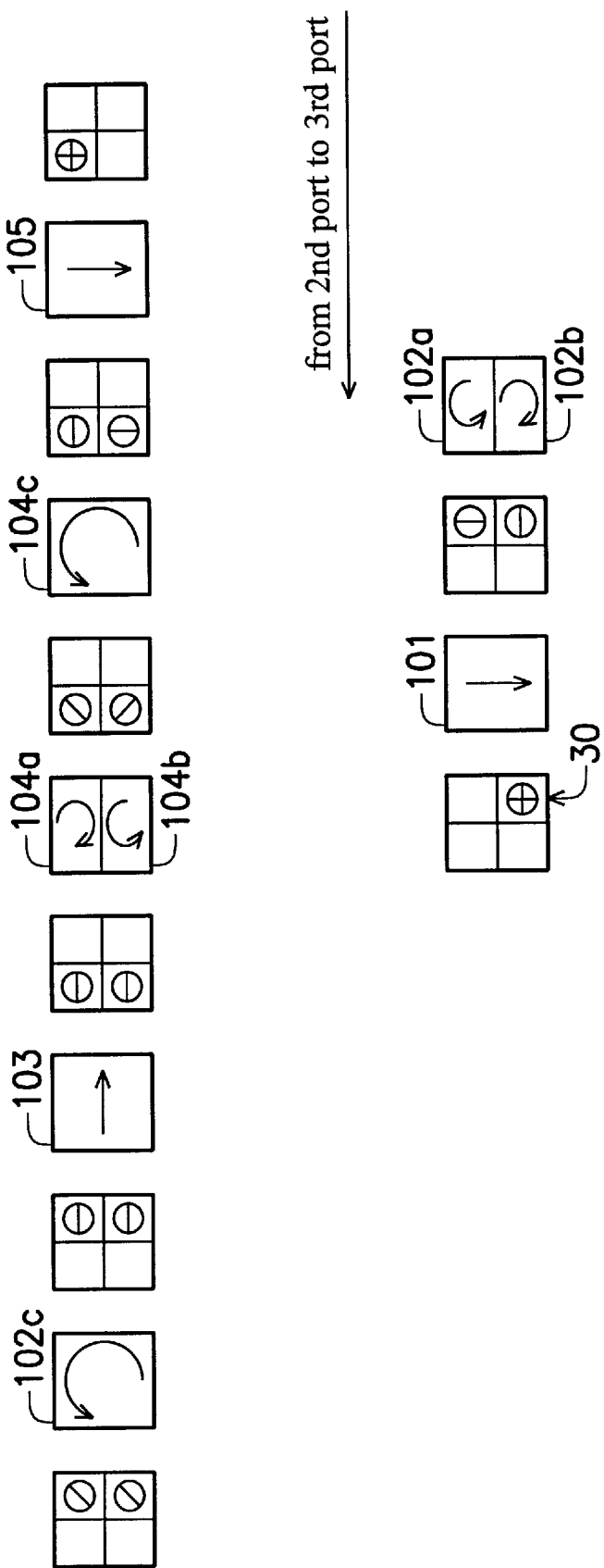
FIG. 3B schematically shows the spatial location and the polarizations of the light beam traveling from the second port to the third port in the compact optical circulator of the first example.

FIG. 3B schematically shows the spatial location and the polarizations of the light beam traveling from the second port to the third port in the compact optical circulator of the first example. Each arrow respectively shows the projecting component of the optical axis of each birefringent crystal in the x-y plane. While a light beam emitted from the second fiber 22 of the single-core collimator 2 is received by the second port 20 of the circulator 1000, the polarization of the light beam is random. When the light beam travels through the third birefringent crystal 105, the light beam is split into two polarized beams according to the arrow representing the walk-off characteristic of the third birefringent crystal 105. One is an e-ray polarized long the y-axis and the other is an o-ray polarized along the x-axis. Next, the two polarized beams travel through the half-wave plate 104c, and the two beams rotate counterclockwise 45 degrees. Next, the e-ray and o-ray respectively travel through the Faraday rotators 104a, 104b, the polarization of the e-ray rotates counterclockwise 45 degrees and the polarization of the o-ray rotates clockwise 45 degrees. Therefore, as the e-ray travels through the third polarization rotator 104, the e-ray is changed into another o-ray. Next, the two polarized beams are shifted toward the minus x-axis according to the arrow representing the walk-off characteristic of the second birefringent crystal 103. Next, the two polarized beams travel through the half-wave plate 102c, and the two polarized beams rotate counterclockwise 45 degrees. Next, the two polarized beams travel through the Faraday rotator 102a, 102b of the first polarization rotator 102, one rotates clockwise 45 degrees to form an o-ray and the other rotates counterclockwise 45 degrees to form an e-ray. When the e-ray travels through the second polarization rotator 104, the second birefringent crystal 103 and the first polarization rotator 102, the e-ray is changed into o-ray. When the o-ray travels through the second polarization rotator 104, the second birefringent crystal 103 and the first polarization rotator 102, the o-ray is changed into e-ray. When the e-ray and o-ray travel through the first birefringent crystal 101, the two polarized beams (e-ray and o-ray) are combined together; wherein the e-ray is shifted toward the o-ray according to the arrow representing the walk-off characteristic of the first birefringent crystal 101. Finally, the third port 30 of the circulator 1000 outputs the light beam into the dual-core collimator 1.

SECOND EXAMPLE

In the second example, the compact optical circulator with three ports includes: a dual-core collimator, a propagation director, a first birefringent crystal, a first polarization rotator, a second birefringent crystal, a second polarization rotator, a third birefringent crystal, and a single-core collimator. The first and second polarization rotators forgo the use of the reciprocal polarizing-rotating unit, such as a half-wave plate, and only include the non-reciprocal polarizing-rotating crystal, such as the Faraday rotator.

Figure 4A:
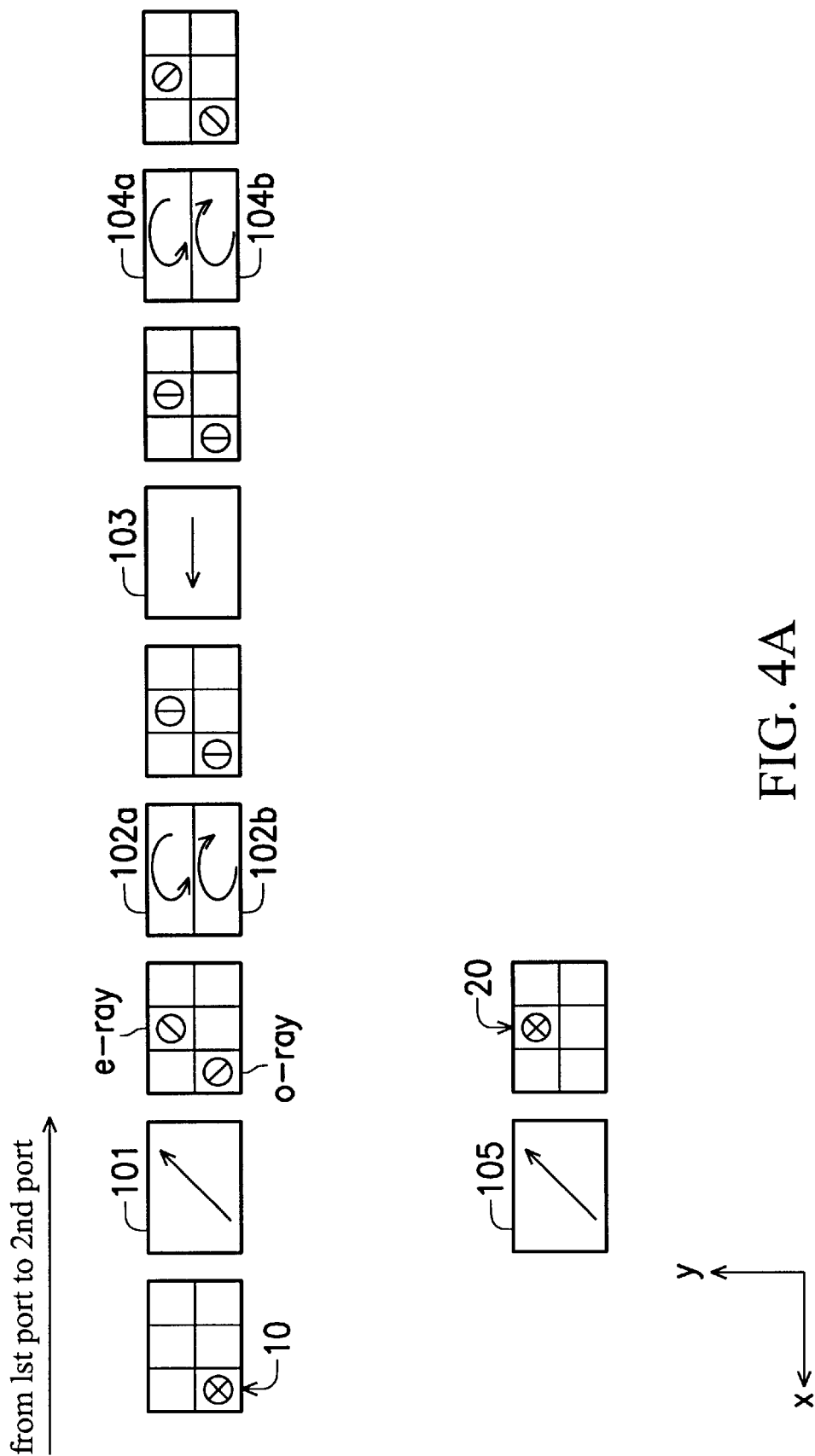
FIG. 4A schematically shows the spatial location and the polarizations of the light beam traveling from the first port to the second port in the compact optical circulator of the second example.

FIG. 4A schematically shows the spatial location and the polarization of the light beam traveling from the first port to the second port in the compact optical circulator of the second example. Each arrow respectively shows the projecting component of the optical axis of each birefringent crystal in the x-y plane. While a light beam emitted from the first fiber 11 of the dual-core collimator 1 is received by the first port 10 of the circulator 1000, the polarization of the light beam is random. When the light beam travels through the first birefringent crystal 101, the light beam is split into two polarized beams according to the arrow representing the walk-off characteristic of the first birefringent crystal 101. One is an e-ray polarized along the projecting component of the optical axis of the first birefringent crystal 101 and the other is an o-ray polarized perpendicular to the projecting component of the optical axis of the first birefringent crystal 101. Next, the e-ray and o-ray respectively travel through the Faraday rotators 102a, 102b, the polarization of the e-ray rotates counterclockwise 45 degrees and the polarization of the o-ray rotates clockwise 45 degrees. Next, the two polarized beams pass the second birefringent crystal 103. Next, the two polarized beams travel through the Faraday rotator 104a, 104b of the second polarization rotator 104, one rotates clockwise 45 degrees and the other rotates counterclockwise 45 degrees. When the e-ray travels through the first polarization rotator 102, the second birefringent crystal 103 and the second polarization rotator 104, the e-ray is changed into o-ray. When the o-ray travels through the first polarization rotator 102, the second birefringent crystal 103 and the second polarization rotator 104, the o-ray is changed into e-ray. When the e-ray and o-ray travel through the third birefringent crystal 105, the two polarized beams (e-ray and o-ray) are combined together; wherein the e-ray is shifted toward the o-ray according to the arrow representing the walk-off characteristic of the third birefringent crystal 105. Finally, the second port 20 of the circulator 1000 outputs the light beam into the single-core collimator 2.

Figure 4B:
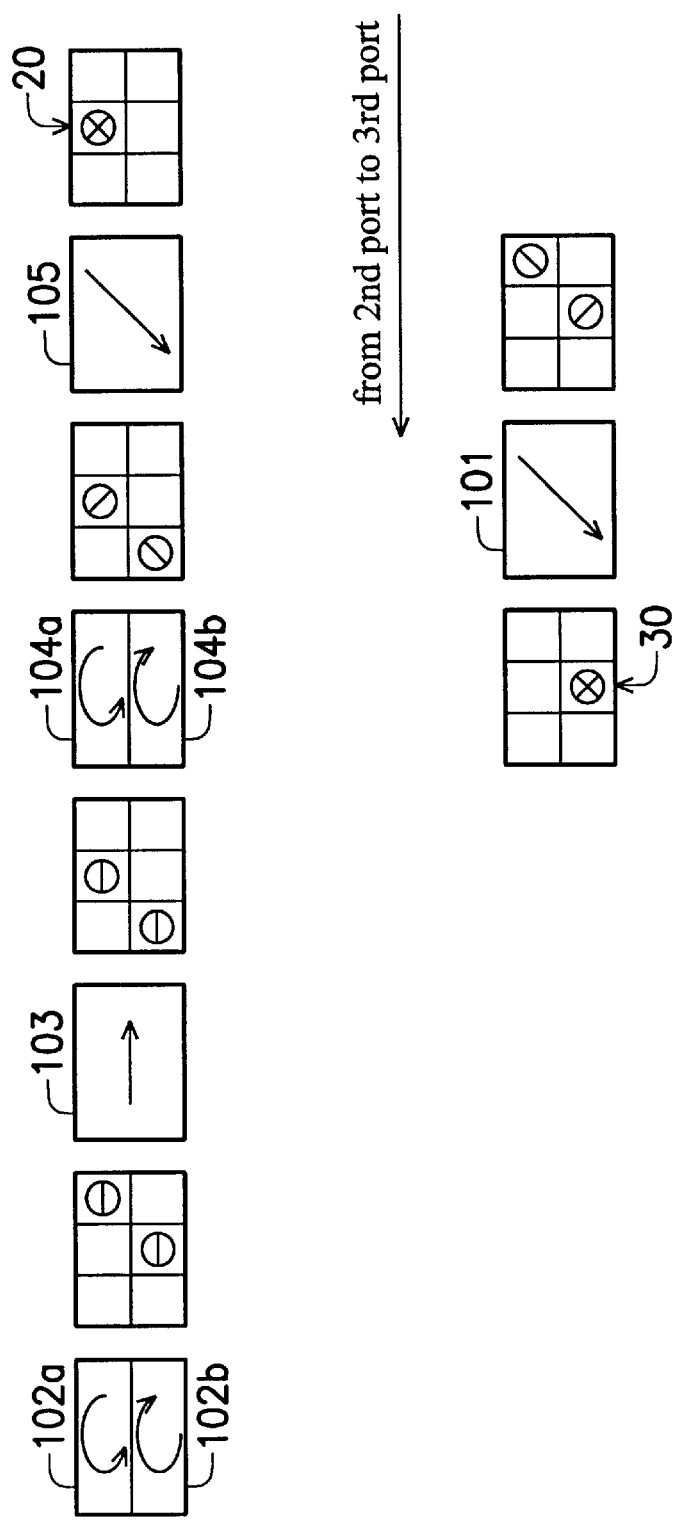
FIG. 4B schematically shows the spatial location and the polarizations of the light beam traveling from the second port to the third port in the compact optical circulator of the second example.

FIG. 4B schematically shows the spatial location and the polarizations of the light beam traveling from the second port to the third port in the compact optical circulator of the second example. Each arrow respectively shows the projecting component of the optical axis of each birefringent crystal in the x-y plane. While a light beam emitted from the second fiber 22 of the single-core collimator 2 is received by the second port 20 of the circulator 1000, the polarization of the light beam is random. When the light beam travels through the third birefringent crystal 105, the light beam is split into two polarized beams according to the arrow representing the walk-off characteristic of the third birefringent crystal 105. One is an e-ray polarized along the projecting component of the optical axis of the third birefringent crystal 105 and the other is an o-ray polarized perpendicular to the projecting component of the optical axis of the third birefringent crystal 105. Next, the e-ray and o-ray respectively travel through the Faraday rotators 104a, 104b, the polarization of the e-ray rotates clockwise 45 degrees and the polarization of the o-ray rotates counterclockwise 45 degrees. Next, the two polarized beams are shifted toward the minus x-axis according to the arrow representing the walk-off characteristic of the second birefringent crystal 103. Next, the two polarized beams travel through the Faraday rotator 102a, 102b of the first polarization rotator 102, one rotates clockwise 45 degrees to form an o-ray and the other rotates counterclockwise 45 degrees to form an e-ray. When the e-ray travels through the second polarization rotator 104, the second birefringent crystal 103 and the first polarization rotator 102, the e-ray is changed into o-ray. When the o-ray travels through the second polarization rotator 104, the second birefringent crystal 103 and the first polarization rotator 102, the o-ray is changed into e-ray. When the e-ray and o-ray travel through the first birefringent crystal 101, the two polarized beams (e-ray and o-ray) are combined together; wherein the e-ray is shifted toward the o-ray according to the arrow representing the walk-off characteristic of the first birefringent crystal 101. Finally, the third port 30 of the circulator 1000 outputs the light beam into the dual-core collimator 1.

Second Embodiment

Figure 5A:
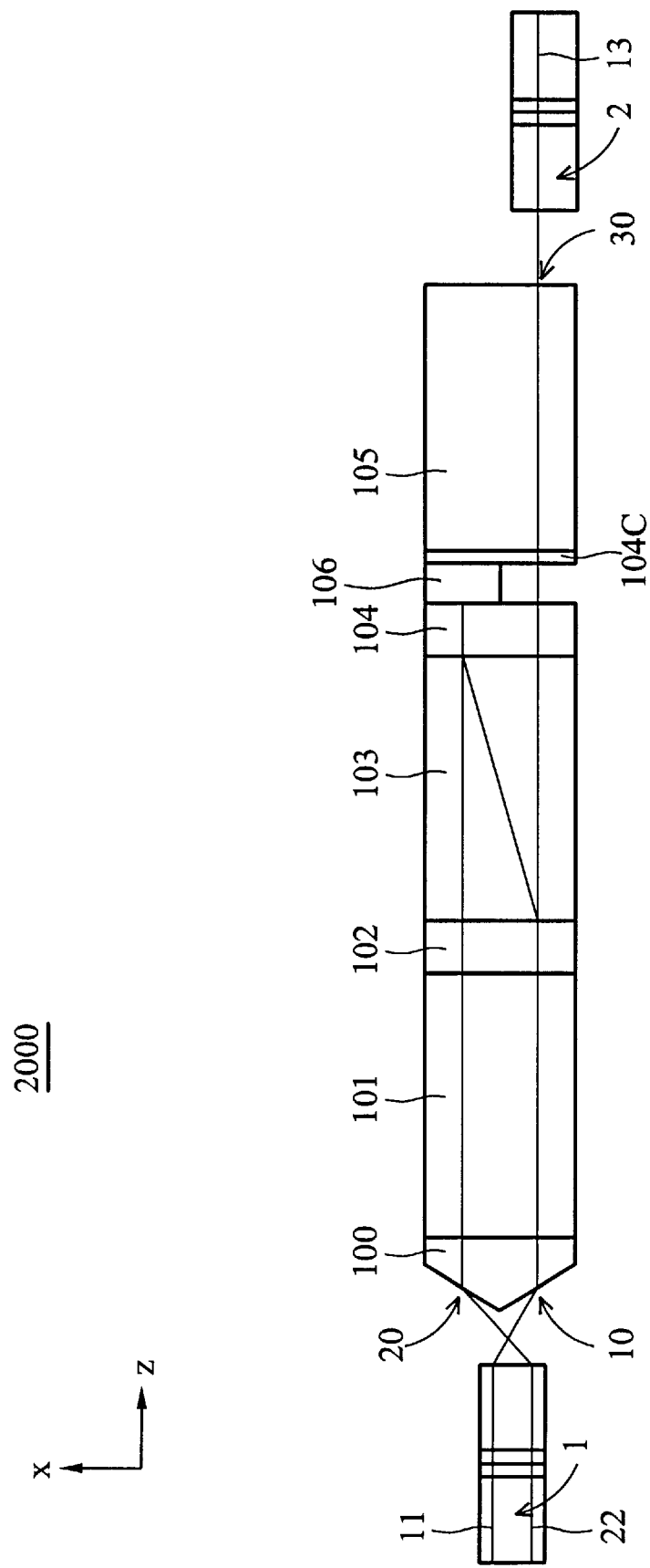
FIG. 5A is a top plane view showing a compact optical circulator of the second embodiment of the invention.
Figure 5B:
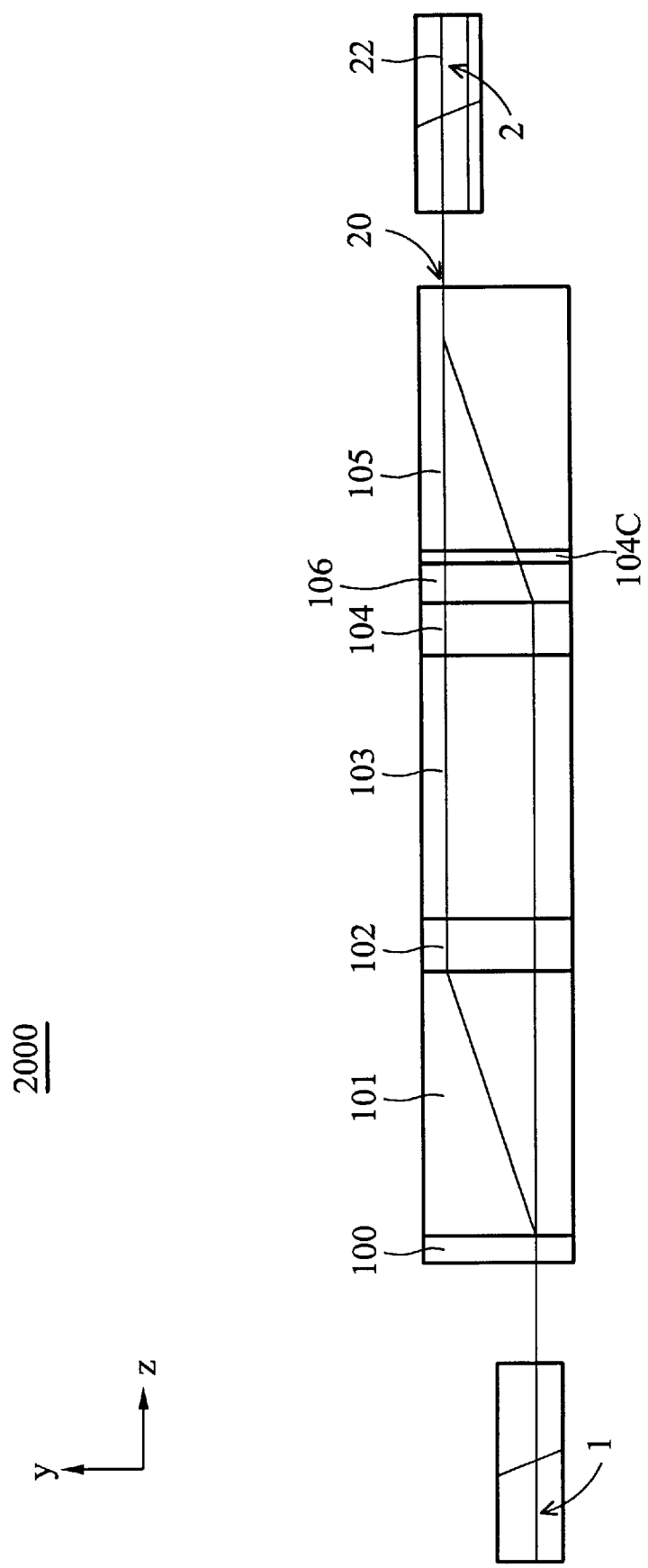
FIG. 5B is a side view showing a compact optical circulator of the second embodiment of the invention.

FIG. 5A is a top plane view showing a compact optical circulator of the second embodiment of the invention, and FIG. 5B is a side view showing a compact optical circulator of the second embodiment of the invention. In the second embodiment of the invention, the compact optical circulator 2000 includes a dual-core collimator 1, a propagation director 100, a first birefringent device 101, a first polarization rotator 102, a second birefringent device 103, a second polarization rotator 104, a reflective compensator 106, a third birefringent device 105 and a single-core collimator 2.

The dual-core collimator 1 generally has a first fiber 11, a second fiber 22 and a GRIN lens (not shown), wherein the first and second fibers 11, 22 are parallel. The compact optical circulator 2000 has three ports; wherein the first and second ports 10, 20 are located at the same side of the circulator 2000, and the third port 30 is located at another side of the circulator 2000. The dual-core collimator 1 emits a light beam to the first port 10 of the circulator 2000, and receives another light beam from the second port 20 of the circulator 2000. In general, the light beam emitted from the first fiber 11 of the dual-core collimator 1 is refracted by travelling through the GRIN lens, and then must be coupled to the first port 10 of the circulator 2000. Then, forming a propagation director 100 with a refracting plane directs the light beam from first fiber 11 to first port 10 by Snell's law. Another light beam emitted from the second port 20 of the circulator 1000 must be coupled to the second fiber 22 of the dual-core collimator 1. Then, forming the propagation director 100 with another refracting plane directs the light beam from second port 20 to second fiber 22 by Snell's law. Therefore, the propagation director 100 can direct one light beam from first fiber 11 to first port 10 and another light beam from second port 20 to second fiber 22 at the same time.

The first birefringent device 101 is a birefringent crystal, such as $LiNbO_3$, $YVO_4$ etc, and has walk-off characteristics. When the first port 10 receives a light beam, the light beam is divided into an e-ray and o-ray by the first birefringent device 101, wherein both the e-ray and o-ray have orthogonal polarizations. When a light beam is received from the first port 10 and divided into two polarized beams in the circulator 2000, the two polarized beams are combined together again by the first birefringent device 101. When a light beam is received from the second port 20, the light beam is divided into two polarized beams by the first birefringent device 101.

The first and second polarization rotators 102 and 104 respectively, have a non-reciprocal polarizing-rotating crystal, such as Faraday rotator, and a reciprocal polarizing-rotating unit, such as a half-wave plate. As well, the first and second polarization rotators 102, 104 can further forgo the use of the reciprocal polarizing-rotating unit, and only include the non-reciprocal polarizing-rotating crystal.

The second birefringent device 103 is also a birefringent crystal and has an optical axis. While a light beam is received from the first port 10 or second port 20 and divided into two polarized beams, the two polarized beams are shifted or not according to the optical axis.

The third birefringent device 105 is also a birefringent crystal. While the second port 20 receives a light beam and the light beam is divided into two polarized beams by the means mentioned above, the two polarized beams are combined together again by the third birefringent device 105.

As shown in FIG. 5A, when a light beam received from the first port 10 is transmitted in the circulator 2000, the light beam is reflected to the second port 20 by a mirror. As the light beam is split into two polarized beams by the first and second birefringent devices 101, 103, the mirror reflects the two polarized beams. Next, the two polarized beams are combined and output at the second port 20. However, an optical path difference ("OPD") is produced between the two polarized beams. For positive birefringent materials, the optical path length ("OPL") of e-ray is longer than the optical path length of o-ray, so an optical path difference is produced between the e-ray and o-ray. Furthermore, polarization mode dispersion ("PMD") is created at the second port 20. In the circulator 2000 of the second embodiment of the invention, a reflective compensator 106 is provided to solve the problem of polarization mode dispersion.

Figure 6B:
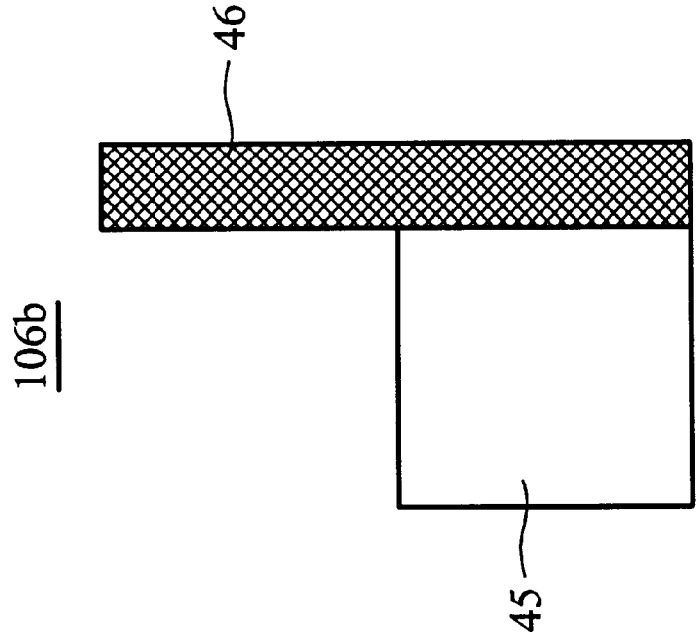
FIGS. 6A and 6B schematically show a reflective compensator of the second embodiment of the invention.
Figure 6A:
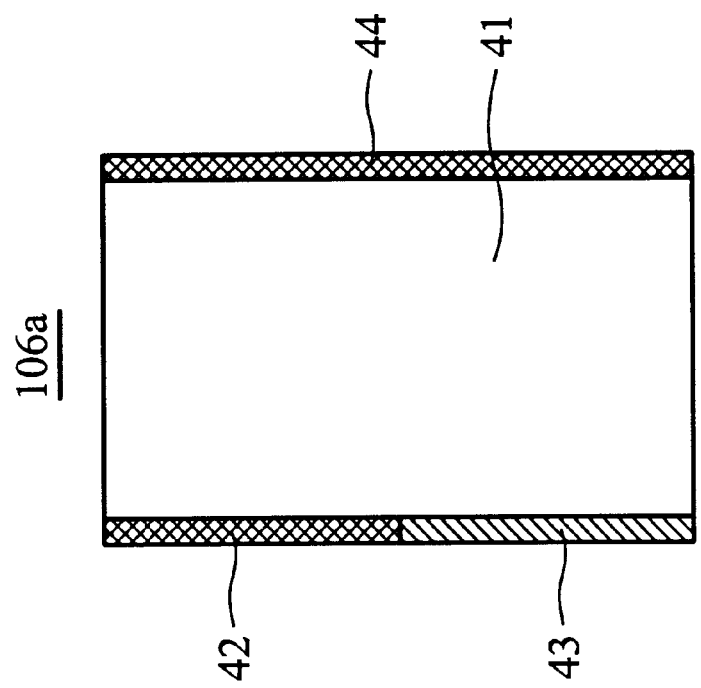

FIG. 6A schematically shows a reflective compensator of the second embodiment of the invention. As shown in FIG. 6A, the reflective compensator 106a is made of transparent material 41, such as glass, and has a first reflecting layer 42, an anti-reflecting layer 43 and a second reflecting layer 44; wherein the first reflecting layer 41 and the anti-reflecting layer 42 forms on the same surface of the reflective compensator 106a, and the second reflecting layer 44 forms on the opposite surface parallel to the first reflecting layer 42 and anti-reflecting layer 43. In the second embodiment, the total area of the first reflecting layer 42 and anti-reflecting layer 43 is equal to the area of the second reflecting layer 44, and the area of the second reflecting layer 44 is half of the cross-sectional area of the optical circulator 2000. As a light beam received from the first port 10 is split into two polarized beams, one polarized beam having longer OPL is reflected by the first reflecting layer 42, and the other polarized beam having shorter OPL passes the anti-reflecting layer 43 and is reflected to leave the reflective compensator 106a by the second reflecting layer 44. The OPL of the polarized beam having shorter OPL is increased by traveling and reflecting in the reflective compensator 106a, the two polarized beams have the same OPL. In other words, the double distance between the anti-reflecting layer 43 and second reflecting layer 44 increases the OPL of one polarized beam having shorter OPL. Accordingly, the reflective compensator 106a of the second embodiment of the invention can solve the problem of OPD. As well, referring to FIGS. 5A, 5B and 6A, the area of the reflective compensator 106a is half of the cross-sectional area of the optical circulator 2000, and then the light beam received from the second port 20 can travel through the reflective compensator 106a.

FIG. 6B schematically shows another reflective compensator of the second embodiment of the invention. As shown in FIG. 6B, the reflective compensator 106b has a reflecting substrate 46 and a transparent material 45, such as glass, disposed on the reflecting substrate 46. As a light beam received from the first port 10 is split into two polarized beams, one polarized beam having longer OPL is reflected by the reflecting substrate 46, and the other polarized beam having shorter OPL enters the transparent material 45 and is reflected to leave the reflective compensator 106b by the reflecting substrate 46. The OPL of the polarized beam having shorter OPL is increased by traveling and reflecting in the reflective compensator 106b, the two polarized beams have the same OPL. In other words, the thickness of the transparent material 45 increases the OPL of one polarized beam having shorter OPL. Accordingly, the reflective compensator 106b of the second embodiment of the invention can solve the problem of OPD. As well, referring to FIGS. 5A, 5B and 6B, the area of the reflective compensator 106b is half of the cross-sectional area of the optical circulator 2000, and then the light beam received from the second port 20 can travel through the reflective compensator 106b.

THIRD EXAMPLE

In the third example, the compact optical circulator with three ports includes: a dual-core collimator, a propagation director, a first birefringent crystal, a first polarization rotator, a second birefringent crystal, a second polarization rotator, a reflective compensator, a third birefringent crystal, and a single-core collimator. The first and second polarization rotators respectively have a Faraday rotator and a half-wave plate, and the reflective compensator is positioned between the Faraday rotator and the half-wave plate of the second polarization rotator.

Figure 7A:
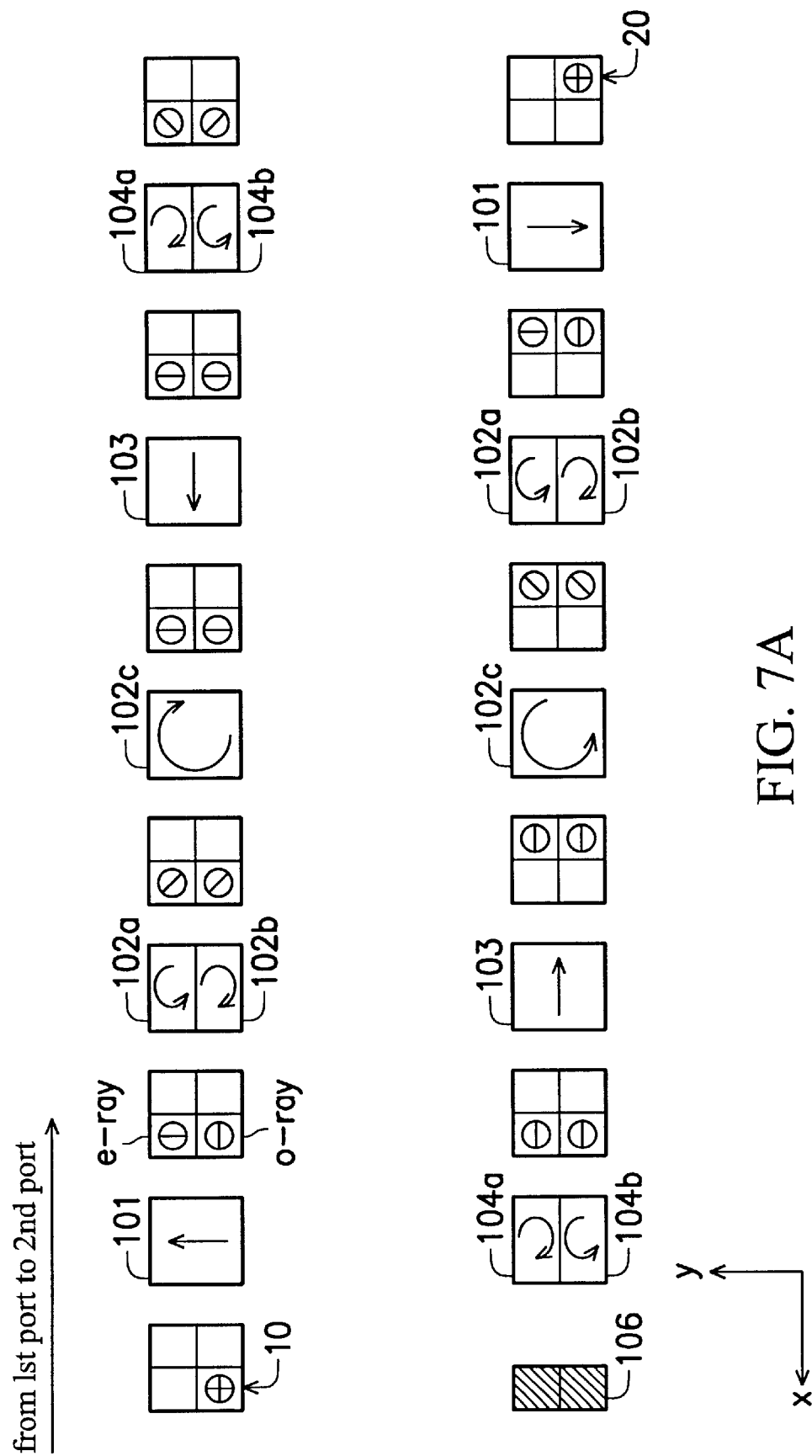
FIG. 7A schematically shows the spatial location and the polarizations of the light beam traveling from the first port to the second port in the compact optical circulator of the third example.

FIG. 7A schematically shows the spatial location and the polarization of the light beam traveling from the first port to the second port in the compact optical circulator of the third example. Each arrow respectively shows the projecting component of the optical axis of each birefringent crystal in the x-y plane. While a light beam emitted from the first fiber 11 of the dual-core collimator 1 is received by the first port 10 of the circulator 2000, the polarization of the light beam is random. When the light beam travels through the first birefringent crystal 101, the light beam is split into two polarized beams according to the arrow representing the walk-off characteristic of the first birefringent crystal 101; wherein one is an e-ray polarized along the y-axis and the other is an o-ray polarized along the x-axis. Next, the e-ray and o-ray respectively travel through the Faraday rotators 102a, 102b, the polarization of the e-ray rotates counterclockwise 45 degrees and the polarization of the o-ray rotates clockwise 45 degrees. Next, the two polarized beams travel through the half-wave plate 102c, the two beams rotate clockwise 45 degrees. After the two polarized beams travel through the first polarization rotator 102, the polarizations of the two polarized beams represent o-ray for the second birefringent crystal 103. Thus, the two polarized beams pass the second birefringent crystal 103 without shifting. Next, the two polarized beams travel through the Faraday rotators 104a, 104b of the second polarization rotator 104, one rotates clockwise 45 degrees and the other rotates counterclockwise 45 degrees. Next, the two polarized beams are respectively reflected onto the Faraday rotators 104a, 104b by the reflective compensator 106. Next, the two polarized beams travel through the Faraday rotators 104a, 104b of the second polarization rotator 104 again, one rotates clockwise 45 degrees and the other rotates counterclockwise 45 degrees. After the two polarized beams travel through the second polarization rotator 104, the polarizations of the two polarized beams represent e-ray for the second birefringent crystal 103. Thus, the two polarized beams are shifted toward the minus x-axis according to the arrow representing the walk-off characteristic of the second birefringent crystal 103. Next, the two polarized beams travel through the half-wave plate 102c, and the two polarized beams rotate counterclockwise 45 degrees. Next, the two polarized beams travel through the Faraday rotators 102a, 102b, one rotates counterclockwise 45 degrees and the other rotates clockwise 45 degrees. When the e-ray and o-ray travel through the first birefringent crystal 101, the two polarized beams (e-ray and o-ray) are combined together; wherein the e-ray is shifted toward the o-ray according to the arrow representing the walk-off characteristic of the first birefringent crystal 101. Finally, the second port 20 of the circulator 2000 outputs the light beam into the second fiber 22 of the dual-core collimator 1.

Figure 7B:
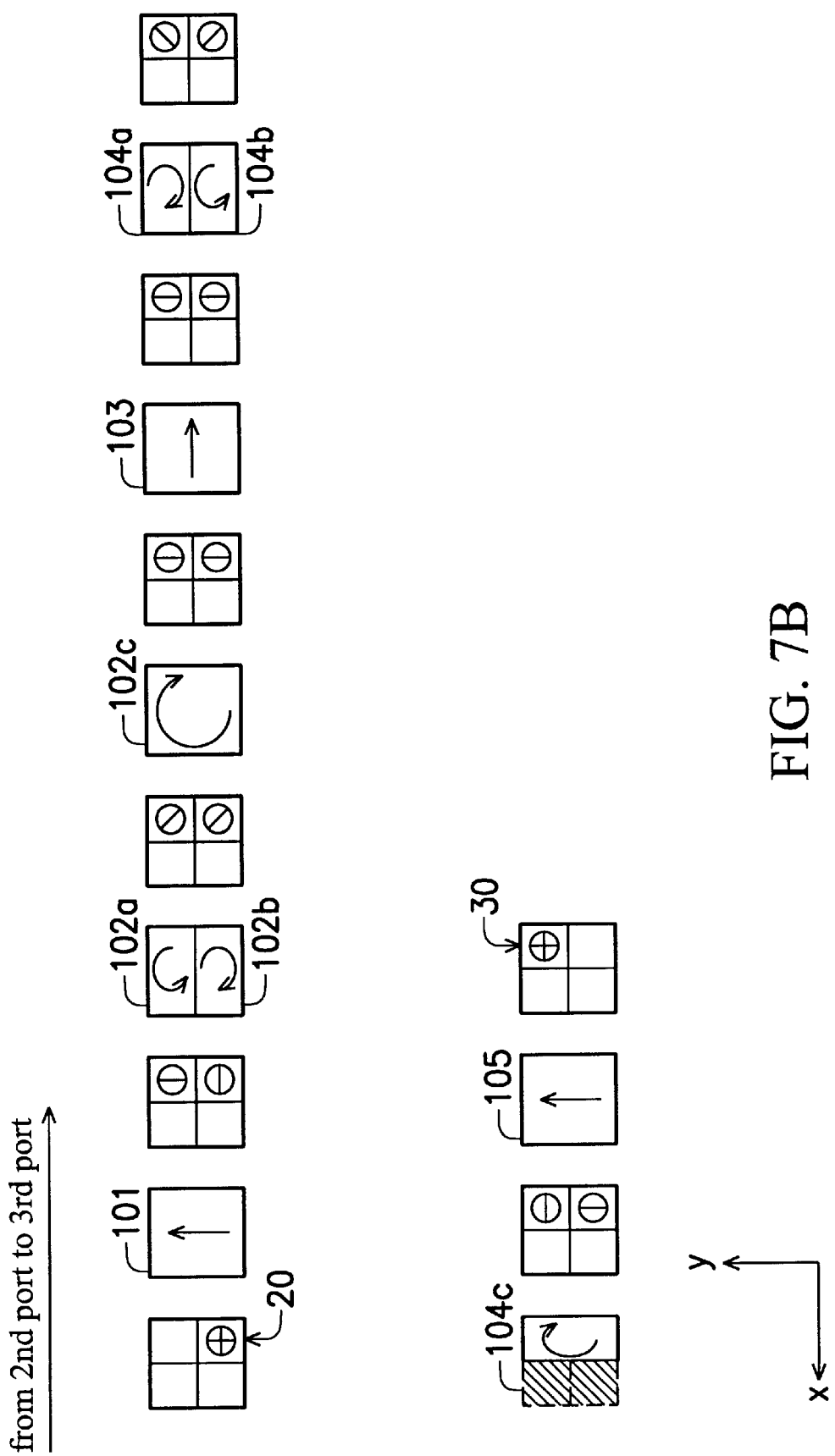
FIG. 7B schematically shows the spatial location and the polarizations of the light beam traveling from the second port to the third port in the compact optical circulator of the third example.

FIG. 7B schematically shows the spatial location and the polarizations of the light beam traveling from the second port to the third port in the compact optical circulator of the third example. Each arrow respectively shows the projecting component of the optical axis of each birefringent crystal in the x-y plane. While a light beam emitted from the second fiber 22 of the dual-core collimator 1 is received by the second port 20 of the circulator 2000, the polarization of the light beam is random. When the light beam travels through the first birefringent crystal 101, the light beam is split into two polarized beams according to the arrow representing the walk-off characteristic of the first birefringent crystal 101. One is an e-ray polarized along the y-axis and the other is an o-ray polarized along the x-axis. Next, the e-ray and o-ray respectively travel through the Faraday rotators 102a, 102b, the polarization of the e-ray rotates counterclockwise 45 degrees and the polarization of the o-ray rotates clockwise 45 degrees. Next, the two polarized beams travel through the half-wave plate 102c, and the two beams rotate clockwise 45 degrees. After the e-ray and o-ray travel through the first polarization rotator 102, the polarizations of the two polarized beams represent e-ray for the second birefringent crystal 103. The two polarized beams pass the second birefringent crystal 103 without shifting. Next, the two polarized beams travel through the Faraday rotator 104a, 104b of the second polarization rotator 104, one rotates clockwise 45 degrees and the other rotates counterclockwise 45 degrees. Next, the two polarized beams travel through the half-wave plate 104c, and the two polarized beams rotate clockwise 45 degrees. For the third birefringent crystal 105, as the e-ray travels through the first polarization rotator 102, the second birefringent crystal 103 and the second polarization rotator 104, the e-ray is changed into o-ray. For the third birefringent crystal 105, as the o-ray travels through the first polarization rotator 102, the second birefringent crystal 103 and the second polarization rotator 104, the o-ray is changed into e-ray. When the e-ray and o-ray travel through the third birefringent crystal 105, the two polarized beams (e-ray and o-ray) are combined together; wherein the e-ray is shifted toward the o-ray according to the arrow representing the walk-off characteristic of the third birefringent crystal 105. Finally, the third port 30 of the circulator 2000 outputs the light beam from the third port 30 to the single-core collimator 1.

FOURTH EXAMPLE

In the fourth example, the compact optical circulator with three ports includes: a dual-core collimator, a propagation director, a first birefringent crystal, a first polarization rotator, a second birefringent crystal, a second polarization rotator, a reflective compensator, a third birefringent crystal, and a single-core collimator. The first and second polarization rotators forgo the use of the reciprocal polarizing-rotating unit, such as a half-wave plate, and only include the non-reciprocal polarizing-rotating crystal, such as the Faraday rotator. The reflective compensator is positioned between the second polarization rotator and the third birefringent crystal.

Figure 8A:
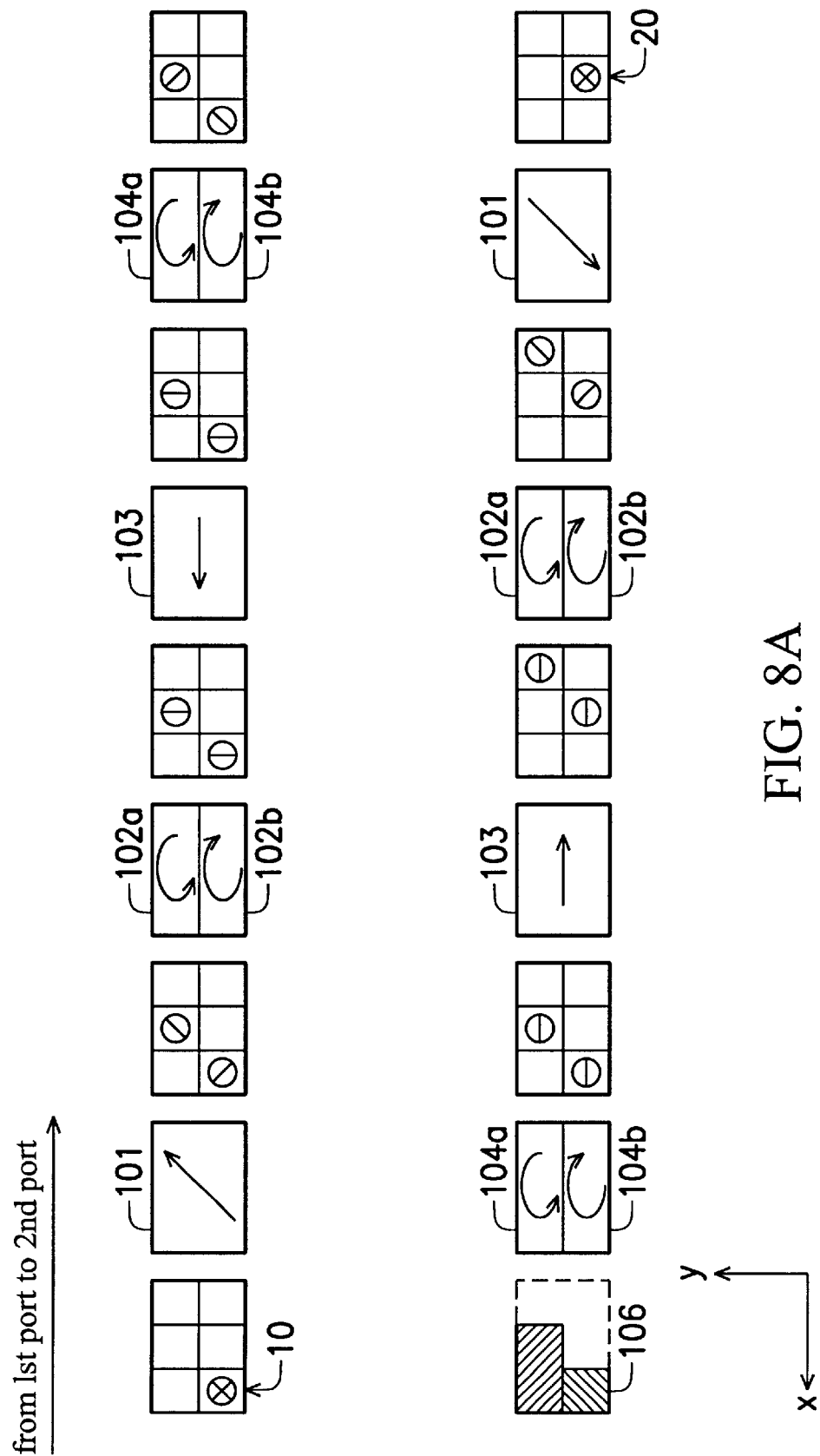
FIG. 8A schematically shows the spatial location and the polarizations of the light beam traveling from the first port to the second port in the compact optical circulator of the fourth example.

FIG. 8A schematically shows the spatial location and the polarizations of the light beam traveling from the first port to the second port in the compact optical circulator of the fourth example. Each arrow respectively shows the projecting component of the optical axis of each birefringent crystal in the x-y plane. While a light beam emitted from the first fiber 11 of the dual-core collimator 1 is received by the first port 10 of the circulator 2000, the polarization of the light beam is random. When the light beam travels through the first birefringent crystal 101, the light beam is split into two polarized beams according to the arrow representing the walk-off characteristic of the first birefringent crystal 101. One is an e-ray polarized along the projecting component of the optical axis of the first birefringent crystal 101 and the other is an o-ray polarized perpendicular to the projecting component of the optical axis of the first birefringent crystal 101. Next, the e-ray and o-ray respectively travel through the Faraday rotators 102a, 102b, the polarization of the e-ray rotates counterclockwise 45 degrees and the polarization of the o-ray rotates clockwise 45 degrees. After the e-ray and o-ray travel through the two Faraday rotators 102a, 102b, the polarizations of the two polarized beams represent o-ray for the second birefringent crystal 103. Next, the two polarized beams travel through the second birefringent crystal 103 without shifting. Next, the two polarized beams travel through the Faraday rotators 104a, 104b of the second polarization rotator 104, one rotates counterclockwise 45 degrees and the other rotates clockwise 45 degrees. Next, the two polarized beams are respectively reflected onto the Faraday rotators 104a, 104b by the reflective compensator 106. Next, the two polarized beams travel through the Faraday rotators 104a, 104b of the second polarization rotator 104 again, one rotates counterclockwise 45 degrees and the other rotates clockwise 45 degrees. After the two polarized beams travel through the second polarization rotator 104, the polarizations of the two polarized beams represent e-ray for the second birefringent crystal 103. Thus, the two polarized beams are shifted toward the minus x-axis according to the arrow representing the walk-off characteristic of the second birefringent crystal 103. Next, the two polarized beams travel through the Faraday rotators 102a, 102b, one rotates counterclockwise 45 degrees and the other rotates clockwise 45 degrees. Next, the two polarized beams travel through the first birefringent crystal 101, the two polarized beams (e-ray and o-ray) are combined together; wherein the e-ray is shifted toward the o-ray according to the arrow representing the walk-off characteristic of the first birefringent crystal 101. Finally, the second port 20 of the circulator 2000 outputs the light beam into the second fiber 22 of the dual-core collimator 1.

Figure 8B:
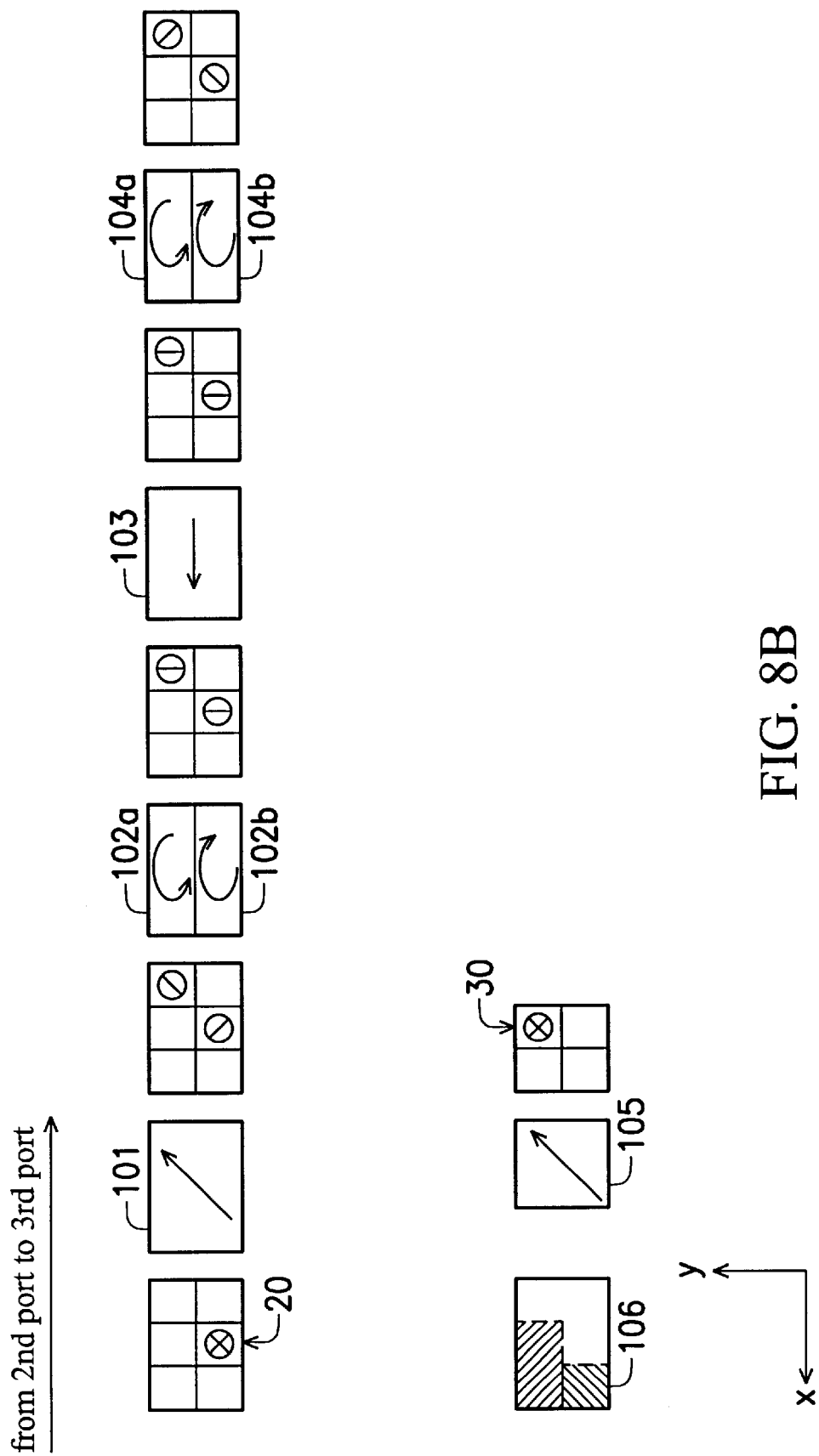
FIG. 8B schematically shows the spatial location and the polarizations of the light beam traveling from the second port to the third port in the compact optical circulator of the fourth example.

FIG. 8B schematically shows the spatial location and the polarizations of the light beam traveling from the second port to the third port in the compact optical circulator of the fourth example. Each arrow respectively shows the projecting component of the optical axis of each birefringent crystal in the x-y plane. While a light beam emitted from the second fiber 22 of the dual-core collimator 1 is received by the second port 20 of the circulator 2000, the polarization of the light beam is random. When the light beam travels through the first birefringent crystal 101, the light beam is split into two polarized beams according to the arrow representing the walk-off characteristic of the first birefringent crystal 101. One is an e-ray polarized along the projecting component of the optical axis of the first birefringent crystal 101 and the other is an o-ray polarized perpendicular to the projecting component of the optical axis of the first birefringent crystal 101. Next, the e-ray and o-ray respectively travel through the Faraday rotators 102a, 102b, the polarization of the e-ray rotates counterclockwise 45 degrees and the polarization of the o-ray rotates clockwise 45 degrees. After the e-ray and o-ray travel through the two Faraday rotators 102a, 102b, the polarizations of the two polarized beams represent o-ray for the second birefringent crystal 103. Next, the two polarized beams travel through the second birefringent crystal 103 without shifting. Next, the two polarized beams travel through the Faraday rotators 104a, 104b of the second polarization rotator 104, one rotates counterclockwise 45 degrees and the other rotates clockwise 45 degrees. When the e-ray travels through the first polarization rotator 102, the second birefringent crystal 103 and the second polarization rotator 104, the e-ray is changed into o-ray. When the o-ray travels through the first polarization rotator 102, the second birefringent crystal 103 and the second polarization rotator 104, the o-ray is changed into e-ray. When the e-ray and o-ray travel through the third birefringent crystal 105, the two polarized beams (e-ray and o-ray) are combined together; wherein the e-ray is shifted toward the o-ray according to the arrow representing the walk-off characteristic of the third birefringent crystal 105. Finally, the third port 30 of the circulator 2000 outputs the light beam into the single-core collimator 2.

In the invention, the birefringent devices mentioned are selected from the group consisting of $LiNbO_3$, $YVO_4$, Calcite, $TiO_2$, and others.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. A compact optical circulator with three ports, positioned between a dual-core collimator and a single-core collimator, wherein a light beam emitted from the dual-core collimator is input at the first port and is transmitted to the single-core collimator via the second port, and a light beam emitted from the single-core collimator is input at the second port and is transmitted to the dual-core collimator via the third port, the compact optical circulator with three ports comprising:

a propagation director coupling the light beam emitted from the dual-core collimator to the first port of the circulator and the light beam emitted from the third port of the circulator to the dual-core collimator;

a first birefringent device including a first optical axis, and having a function of splitting a light beam into two orthogonal polarized beams and combining two orthogonal polarized beams together;

a second birefringent device including a second optical axis, and shifting two polarized beams entering the second birefringent device according to the second optical axis;

a third birefringent device including a third optical axis, and having a function of splitting a light beam into two orthogonal polarized beams and combining two orthogonal polarized beams together;

a first polarization rotator including a pair of non-reciprocal polarizing-rotating devices and a reciprocal polarizing-rotating device, positioned between the first and second birefringent devices to change the polarization of the polarized beam; and a second polarization rotator including a pair of non-reciprocal polarizing-rotating devices and a reciprocal polarizing-rotating device, positioned between the second and third birefringent devices to change the polarization of the polarized beam.

2. A compact optical circulator with three ports as claimed in claim 1, wherein the first, second and third birefringent devices are selected from the groups consisting of LiNbO3, YVO4, Calcite, and TiO2.

3. A compact optical circulator with three ports as claimed in claim 1, wherein the non-reciprocal polarizing-rotating device is a Faraday rotator.

4. A compact optical circulator with three ports as claimed in claim 1, wherein the reciprocal polarizing-rotating device is a half-wave plate.

5. A compact optical circulator with three ports, positioned between a dual-core collimator and a single-core collimator, wherein a light beam emitted from the dual-core collimator is input at the first port and is transmitted to the single-core collimator via the second port, and a light beam emitted from the single-core collimator is input at the second port and is transmitted to the dual-core collimator via the third port, the compact optical circulator with three ports comprising:

a propagation director coupling the light beam emitted from the dual-core collimator to the first port of the circulator and the light beam emitted from the third port of the circulator to the dual-core collimator;

a first birefringent device including a first optical axis, and having a function of splitting a light beam into two orthogonal polarized beams and combining two orthogonal polarized beams together;

a second birefringent device including a second optical axis, and shifting two polarized beams entering the second birefringent device according to the second optical axis;

a third birefringent device including a third optical axis, and having a function of splitting a light beam into two orthogonal polarized beams and combining two orthogonal polarized beams together;

a first polarization rotator including a pair of non-reciprocal polarizing-rotating devices, positioned between the first and second birefringent devices to change the polarization of the polarized beam; and a second polarization rotator including a pair of non-reciprocal polarizing-rotating devices, positioned between the second and third birefringent devices to change the polarization of the polarized beam.

6. A compact optical circulator with three ports as claimed in claim 5, wherein the first, second and third birefringent devices are selected from the groups consisting of LiNbO3, YVO4, Calcite, and TiO2.

7. A compact optical circulator with three ports as claimed in claim 5, wherein the non-reciprocal polarizing-rotating device is a Faraday rotator.

8. A compact optical circulator with three ports, positioned between a dual-core collimator and a single-core collimator, wherein a light beam emitted from the dual-core collimator is input at the first port and is transmitted to the dual-core collimator via the second port, and a light beam emitted from the dual-core collimator is input at the second port and is transmitted to the single-core collimator via the third port, the compact optical circulator with three ports comprising:
   a propagation director coupling the light beam emitted from the dual-core collimator to the first port of the circulator and the light beam emitted from the third port of the circulator to the dual-core collimator;
   a first birefringent device including a first optical axis, and having a function of splitting a light beam into two orthogonal polarized beams and combining two orthogonal polarized beams together;
   a second birefringent device including a second optical axis, and shifting two polarized beams entering the second birefringent device according to the second optical axis;
   a third birefringent device including a third optical axis, and having a function of splitting a light beam into two orthogonal polarized beams and combining two orthogonal polarized beams together;
   a first polarization rotator including a pair of non-reciprocal polarizing-rotating devices and a reciprocal polarizing-rotating device, positioned between the first and second birefringent devices to change the polarization of the polarized beam;
   a second polarization rotator including a pair of non-reciprocal polarizing-rotating devices and a reciprocal polarizing-rotating device, positioned between the second and third birefringent devices to change the polarization of the polarized beam; and
   a reflective compensator positioned between the non-reciprocal polarizing-rotating device and the reciprocal polarizing-rotating device of the second polarization rotator and having functions of reflecting the beams from the first port and passing the beams from the second port.

9. A compact optical circulator with three ports as claimed in claim 8, wherein the first, second and third birefringent devices are selected from the groups consisting of LiNbO3, YVO4, Calcite, and TiO2.

10. A compact optical circulator with three ports as claimed in claim 8, wherein the non-reciprocal polarizing-rotating device is a Faraday rotator.

11. A compact optical circulator with three ports as claimed in claim 8, wherein the reciprocal polarizing-rotating device is a half-wave plate.

12. A compact optical circulator with three ports as claimed in claim 8, wherein the reflective compensator includes a transparent material, a first reflecting layer formed on the transparent material, an anti-reflecting layer formed on the transparent material having the same surface with the first reflecting layer and a second reflecting layer formed on the transparent material, opposite to the surface of the first reflecting layer and anti-reflecting layer; wherein one polarized beam from the first port is reflected by the first reflecting layer and the other polarized beam from the first port transmits through the anti-reflecting layer and transparent material and is reflected by the second reflecting layer.

13. A compact optical circulator with three ports as claimed in claim 8, wherein the reflective compensator includes a reflecting substrate and a transparent material disposed on the reflecting substrate; wherein one polarized beam form the first port is reflected by the reflecting substrate and the other polarized beam from the first port transmits through the transparent material and is reflected by the reflecting substrate.

14. A compact optical circulator with three ports, positioned between a dual-core collimator and a single-core collimator, wherein a light beam emitted from the dual-core collimator is input at the first port and is transmitted to the dual-core collimator via the second port, and a light beam emitted from the dual-core collimator is input at the second port and is transmitted to the single-core collimator via the third port, the compact optical circulator with three ports comprising:
   a propagation director coupling the light beam emitted from the dual-core collimator to the first port of the circulator and the light beam emitted from the third port of the circulator to the dual-core collimator;
   a first birefringent device including a first optical axis, and having a function of splitting a light beam into two orthogonal polarized beams and combining two orthogonal polarized beams together;
   a second birefringent device including a second optical axis, and shifting two polarized beams entering the second birefringent device according to the second optical axis;
   a third birefringent device including a third optical axis, and having a function of splitting a light beam into two orthogonal polarized beams and combining two orthogonal polarized beams together;
   a first polarization rotator including a pair of non-reciprocal polarizing-rotating devices and is positioned between the first and second birefringent devices to change the polarization of the polarized beam;
   a second polarization rotator including a pair of non-reciprocal polarizing-rotating devices and is positioned between the second and third birefringent devices to change the polarization of the polarized beam; and
   a reflective compensator positioned between the non-reciprocal polarizing-rotating device and the reciprocal polarizing-rotating device of the second polarization rotator and having functions of reflecting the beams from the first port and passing the beams from the second port.

15. A compact optical circulator with three ports as claimed in claim 14, wherein the first, second and third birefringent devices are selected from the groups consisting of LiNbO3, YVO4, Calcite, and TiO2.

16. A compact optical circulator with three ports as claimed in claim 14, wherein the non-reciprocal polarizing-rotating device is a Faraday rotator.

17. A compact optical circulator with three ports as claimed in claim 14, wherein the reflective compensator includes a transparent material, a first reflecting layer formed on the transparent material, an anti-reflecting layer formed on the transparent material having the same surface with the first reflecting layer and a second reflecting layer formed on the transparent material that is opposite to the surface of the first reflecting layer and anti-reflecting layer; wherein one polarized beam from the first port is reflected by the first reflecting layer and the other polarized beam from the first port transmits through the anti-reflecting layer and transparent material and is reflected by the second reflecting layer.

18. A compact optical circulator with three ports as claimed in claim 14, wherein the reflective compensator includes a reflecting substrate and a transparent material disposed on the reflecting substrate; wherein one polarized beam form the first port is reflected by the reflecting substrate and the other polarized beam from the first port transmits through the transparent material and is reflected by the reflecting substrate.

* * * * *